United States Patent
Ruth

(10) Patent No.: US 8,893,830 B2
(45) Date of Patent: Nov. 25, 2014

(54) AUTOMATED PANTOGRAPH CONTROL FOR MINING TRUCK POWER SYSTEM

(75) Inventor: Eric J. Ruth, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 327 days.

(21) Appl. No.: 13/299,385

(22) Filed: Nov. 18, 2011

(65) Prior Publication Data

US 2013/0126250 A1    May 23, 2013

(51) Int. Cl.
| | |
|---|---|
| *B60L 9/00* | (2006.01) |
| *B60L 5/00* | (2006.01) |
| *B60L 5/04* | (2006.01) |
| *B60L 5/24* | (2006.01) |
| *B60L 5/26* | (2006.01) |
| *B60L 5/28* | (2006.01) |
| *B60L 11/02* | (2006.01) |
| *B60M 7/00* | (2006.01) |
| *B60L 5/36* | (2006.01) |
| *B60L 11/18* | (2006.01) |

(52) U.S. Cl.
CPC . *B60L 9/00* (2013.01); *B60L 11/02* (2013.01); *B60M 7/00* (2013.01); *B60L 5/36* (2013.01); *B60L 11/1801* (2013.01); *B60L 2200/36* (2013.01)
USPC .............................. 180/2.1; 191/85; 191/33 R

(58) Field of Classification Search
CPC .............. B60L 9/00; B60L 5/00; B60L 5/04; B60L 5/24; B60L 5/26; B60L 5/28
USPC ................................ 180/2.1; 191/4, 85, 33 R
See application file for complete search history.

(56) References Cited

U.S. PATENT DOCUMENTS

| | | | |
|---|---|---|---|
| 3,080,982 A | 3/1963 | Borcherdt | |
| 4,745,997 A | 5/1988 | Takei et al. | |
| 7,126,299 B2 | 10/2006 | Jackson | |
| 2010/0121509 A1* | 5/2010 | Takeshima et al. | 701/22 |
| 2011/0030574 A1* | 2/2011 | Kitanaka | 105/49 |

FOREIGN PATENT DOCUMENTS

| | | |
|---|---|---|
| DE | 10256705 A1 | 4/2002 |
| DE | 10256705 B4 | 4/2002 |
| EP | 1591301 | 11/2005 |
| KR | 1020110065684 | 6/2011 |
| SE | PCTSE9200697 | 10/1992 |
| WO | 2009007879 | 1/2009 |
| WO | WO 2010121707 A1 * | 10/2010 |
| WO | 2011049661 | 4/2011 |

* cited by examiner

*Primary Examiner* — Hau Phan
*Assistant Examiner* — Bryan Evans
(74) *Attorney, Agent, or Firm* — Liell & McNeil Attorneys, PC

(57) ABSTRACT

Controlling a power system in a mining truck includes receiving data indicative of an expected change in suitability of the mining truck for on-trolley operation, and outputting a control command to an actuating mechanism for a pantograph responsive to the data and prior to occurrence of the expected suitability change. A mining truck and power system are further provided, wherein a pantograph having an electrical contactor is adjusted between a first configuration contacting an overhead trolley line, and a rest configuration, responsive to data indicative of the expected suitability change.

20 Claims, 6 Drawing Sheets

AUTOMATED PANTOGRAPH CONTROL FOR MINING TRUCK POWER SYSTEM

TECHNICAL FIELD

The present disclosure relates generally to mining trucks of the type suitable for trolley assisted operation, and relates more particularly to autonomously adjusting a pantograph of a mining truck based on suitability of the mining truck for on-trolley operation.

BACKGROUND

The large scale mining of materials tends to be an energy intensive endeavor. In many opencast mines, a fleet of large mining trucks may operate almost continuously to transport ore and overburden from an extraction area to a dump or processing site. Many such mining trucks are operated via diesel-powered engines. Both direct drive diesel engines and diesel-electric drive systems have been used over the years. As with many other heavy equipment systems, fuel costs for mining trucks can be substantial. Moreover, many mines are located in remote locations, and the costs of transporting fuel to the mine site can add significantly to the operational expense. Even obtaining sufficient fuel supplies can be challenging, regardless of cost. For these and other reasons, engineers in the mining industry and mining equipment manufacturers are continually searching for ways to reduce fuel consumption. Given the historical price volatility of commodities, of which mined materials and petroleum fuels are both examples, as well as variation in geology and topography among mine sites, the economics of supplying and consuming energy for mining activities tends to be complex and variable.

For decades mine operators have experimented with the use of electric power generated on-site or supplied from a utility grid, to power mining equipment. On-site electric power generation has similar cost and availability concerns to fueling equipment directly via petroleum fuels. Due to the remoteness of many mines and other factors, supplying electrical power from a grid, even over relatively long distances, has proven consistently advantageous for at least certain mines as compared to reliance on petroleum fuels alone. Electric power costs can nevertheless vary due to market fluctuations, as well as varying from mine to mine depending upon regional availability of fossil fuels, geothermal or hydroelectric power, or other native or obtainable sources of energy for electricity generation. Thus, even where electric powering of mining equipment is viable, there remains ample motivation to use it as efficiently as possible, both to control costs and optimize predictability in the face of uncertain economics.

While first proposed decades ago, one contemporary example of the use of electric power at mine sites is a trolley system having an overhead trolley line to provide electrical power to assist mining trucks, particularly when traveling loaded upon uphill grades. Many opencast mines include a haul road extending from an extraction site for ore to a remote dump site or processing location. The mining trucks used at such site may need to travel an uphill grade on the haul road that is several kilometers long, or possibly even longer. It will be appreciated that the use of diesel or other petroleum fuels to propel mining trucks carrying literally hundreds of tons of ore up such grades can be quite costly, and thus trolley systems have received renewed interest in recent years.

Mining trucks configured to be assisted with electrical power from a trolley line typically include a mechanism known as a pantograph which can be used to reach upwardly and/or outwardly from a mining truck to electrically contact the trolley line, and thus provide electric power for propulsion rather than generating the power on-board the mining truck itself. In conventional practice, an operator visually monitors the proximity of their mining truck to an overhead trolley line, and actuates the pantograph to engage the trolley line at a desired location, then disengages the pantograph from the trolley line at its end. Mining truck operators are already tasked with steering and otherwise controlling what amounts to an extraordinarily large and heavy machine. Accordingly, highly skilled operators having extensive training and experience are often selected for operating mining trucks. Despite such skill and training, operators tend to direct their attention more to avoiding obstacles and collisions than optimally timing the actuation of the pantograph. Moreover, steering a mining truck such that it remains electrically connected with the trolley line can itself be a challenging endeavor. As a result, many mining trucks are operated less often, or more conservatively, on-trolley than they optimally might be. Adding still further to these challenges is the fact that a trolley line may not always be available. Maintenance, repairs, and electrical faults generated where trucks unintentionally steer off or onto a trolley line can require the trolley line to be temporarily de-energized, disrupting smooth and predictable flow of operations at the mine.

U.S. Pat. No. 4,694,125 to Takei et al. is directed to a collector device for trolley-assisted vehicles having a pantograph circuit. The circuit de-energizes a valve controlling pantograph position when a driver leaves the vehicle. In other words, Takei et al. appear to propose disconnecting the pantograph from a trolley line when an operator stops the truck and intends to exit. While preventing electrical shocks to an operator is surely a valid goal, Takei et al. appear to offer no solutions to the challenges of energy consumption, costs, and efficiency at modern mine sites.

SUMMARY

In one aspect, a method of controlling a power system in a trolley assist-capable mining truck includes receiving data indicative of an expected change in suitability of the mining truck for on-trolley operation, and outputting a control command to an actuating mechanism for a pantograph of the power system, responsive to the data and prior to occurrence of the expected suitability change. The method further includes adjusting the pantograph between an on-trolley configuration, for powering an electric propulsion motor of the mining truck via electric power from an overhead trolley line, and a rest configuration, responsive to the control command.

In another aspect, a power system for a trolley assist-capable mining truck includes a pantograph for powering an electric propulsion motor of the mining truck via electric power from an overhead trolley line, the pantograph including a linkage configured to couple with a body of the mining truck. The pantograph further includes an electrical contactor coupled with the linkage, and an actuating mechanism configured to adjust the pantograph between an on-trolley configuration for contacting the electrical contactor with the overhead trolley line, and a rest configuration. The power system further includes an electronic control unit in control communication with the actuating mechanism, the electronic control unit being configured to receive data indicative of an expected change in suitability of the mining truck for on-trolley operation, and responsively output a control command to the actuating mechanism prior to occurrence of the expected suitability change.

In still another aspect, a mining truck includes a frame, ground engaging propulsion elements coupled with the frame, and a power system. The power system includes an electric propulsion motor, and a pantograph configured for powering the electric propulsion motor via electric power from an overhead trolley line. The pantograph includes an actuating mechanism configured to adjust the pantograph between an on-trolley configuration for contacting the overhead trolley line, and a rest configuration. The power system further includes an electronic control unit configured to receive data indicative of an expected change in suitability of the mining truck for on-trolley operation, and to responsively output a control command to the actuating mechanism prior to occurrence of the expected suitability change.

DETAILED DESCRIPTION

Figure 1:
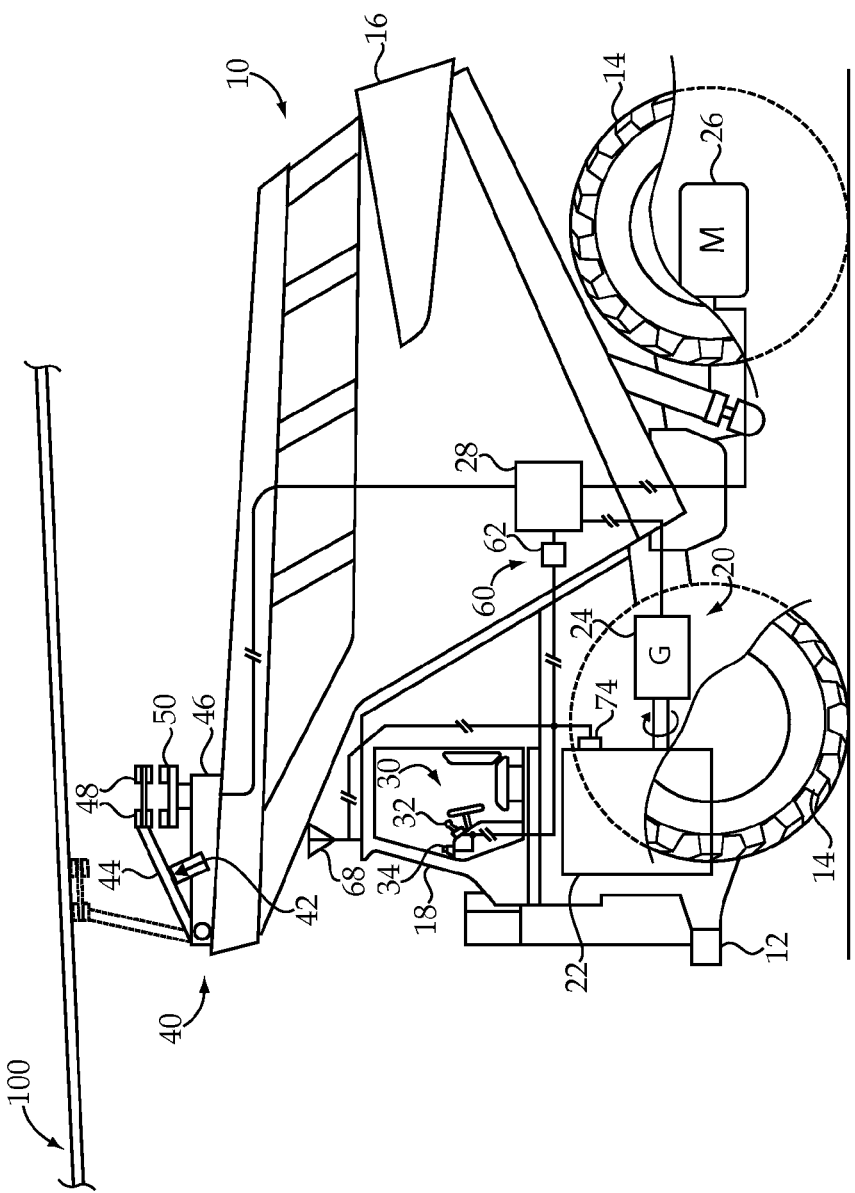
FIG. 1 is a side diagrammatic view of a mining truck, according to one embodiment.

Referring to FIG. 1, there is shown a trolley-assist capable mining truck 10 according to one embodiment. Mining truck 10 may include a body or frame 12 having ground engaging propulsion elements 14 coupled with frame 12. In the illustrated embodiment, ground engaging propulsion elements 14 include a set of two front wheels, and a set of four back wheels, although the present disclosure is not thereby limited. A bed 16 is coupled with and/or part of frame 12, and may be tilted between a lowered position, as shown, and a lifted position to dump material from bed 16 in a conventional manner. Mining truck 10 may further include a power system 20 having a combustion engine 22, such as a compression ignition internal combustion engine, and a generator 24 powered via engine 22. Power system 20 may further include one or more electric propulsion motors 26 coupled with the back ground engaging elements 14. Power system 20 may further include a line connecting mechanism 40 configured to electrically connect power system 20 with an overhead trolley line 100. As noted above, mining truck 10 may be trolley-assist capable. Those skilled in the art will be familiar with mining trucks configured to operate via electrical power from an overhead trolley line in certain instances, such as when carrying a load of material on an uphill grade. In one practical implementation strategy, mining truck 10 may transition between an on-trolley mode where power system 20 is receiving power entirely, or partly, from overhead trolley line 100, and an off-trolley mode or generator mode where power is received entirely from engine 22/generator 24. Embodiments are nevertheless contemplated in which a blend of electric power from both generator 24 and trolley line 100 is used while on-trolley. As will be further apparent from the following description, power system 20 may be proactively controlled in anticipation of changes in suitability of mining truck 10 for on-trolley operation, and in anticipation of availability of power from trolley line 100.

A cab 18 may be mounted to frame 12, and an operator control station 30 may be positioned within cab 18. Operator control station 30 may include a variety of operator input devices for controlling and monitoring operation of mining truck 10. To this end, a throttle control lever or similar device 32, and a pantograph automation switch 34, may be positioned at operator control station 30, the significance of each of which is further discussed herein.

Line connecting mechanism 40 may include a pantograph, having an actuation mechanism 42, a linkage 44 coupled with a base 46 configured to mount to frame 12, for instance to a front of bed 16. Pantograph 40 may be adjustable by way of actuating mechanism 42 between an on-trolley configuration for contacting trolley line 100, and a rest configuration. Pantograph 40 may further include a set of two electrical contactors 48 mounted to linkage 44 which electrically connect power system 20 with trolley line 100 in the on-trolley configuration. Pantograph 40 may be positioned upon a rest 50 in the rest configuration. As illustrated in FIG. 1, the on-trolley configuration may include a raised position of pantograph 40, whereas the rest configuration may include a lowered position of pantograph 40. Pantograph 40, and in particular electrical contactors 48, may electrically connect with power system electronics 28 configured for sourcing and distributing electrical power within power system 20 in a manner further described herein.

Mining truck 10 may further include a power control system 60. Control system 60 may be in communication with the operator input devices located at operator control station 30, as well as other monitoring and control devices of mining truck 10, including a receiver or antenna 68, power system electronics 28, and an electrically actuated engine throttle 74. Control system 60 may further include an electronic control unit 62 which receives electronic data, including electronic data from receiver 68 indicative of an expected change in suitability of mining truck 10 for on-trolley operation. Electronic control unit 62 may further be in control communication with actuating mechanism 42, and configured to output a control command to actuating mechanism 42 responsive to the electronic data, and prior to occurrence of the expected suitable change.

In another aspect, control system 60 may be configured to transition power system 20 between an on-trolley mode receiving electrical power from trolley line 100 to an off-trolley mode, based at least in part upon availability or unavailability of segments of trolley line 100. To this end, electronic control unit 62 may be further configured to receive data indicative of expected procession of mining truck 10 from a first part of a travel path coinciding with an available segment of trolley line 100, to a succeeding part of the travel path coinciding with an unavailable segment. Electronic control unit 62 may command transitioning power system 20 from the on-trolley mode to the off-trolley mode responsive to the data. Each of these capabilities, controllably actuating pantograph 40 responsive to an expected change in suitability of mining truck 10 for on-trolley operation, and controllably transitioning power system 20 responsive to differing trolley line segment availability, is further discussed below and illustrated by way of examples.

Figure 2:
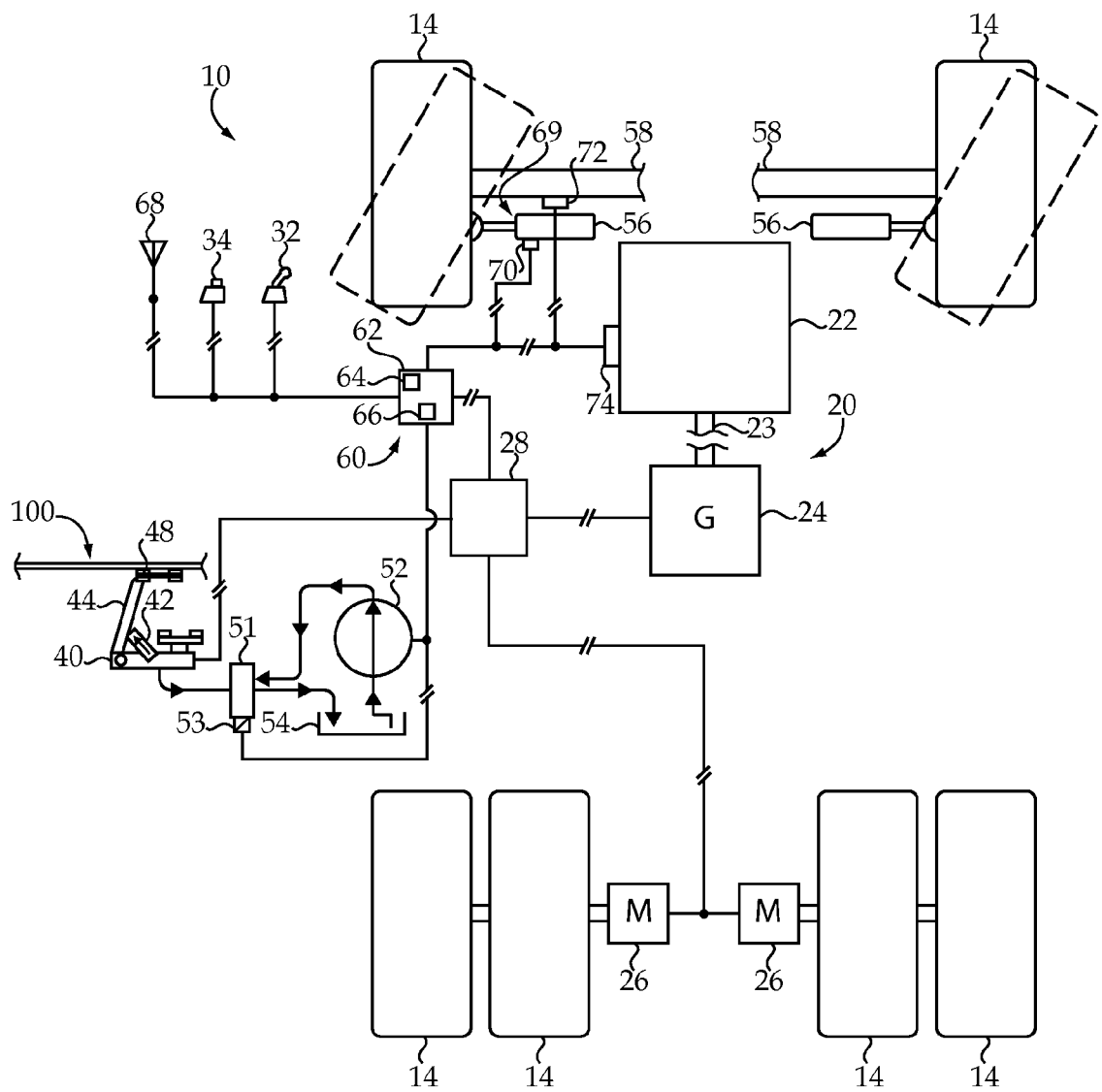
FIG. 2 is a schematic view of the mining truck of FIG. 1.

Referring now to FIG. 2, there is shown a schematic illustration of certain parts of mining truck 10, and illustrating features in addition to those shown in FIG. 1. It will recalled that mining truck 10 may include at least one electric propulsion motor. In a practical implementation strategy as shown in FIG. 2, an electric propulsion motor 26 powers each of two sets of two back wheels 14, however, a common propulsion motor for each of the sets of wheels might also be used. Also shown in FIG. 2 is generator 24 coupled with engine 22. Generator 24 may be rotated via an output shaft 23 of engine 22, and additional components (not shown) such as a transmission and a gearbox may be coupled between engine 22 and generator 24 in a conventional manner. Power system electronics 28 are shown electrical connecting with generator 24 and with propulsion motors 26. Electronics 28 are also shown electrically connected with pantograph 40, and in particular with electrical contactors 48. Electronics 28 may include various components known to those skilled in the art, such as inverters, switches, and a resistive grid for dissipating excess power and/or an electrical energy storage device such as a battery or capacitor. In the illustrated embodiment, only one pantograph is shown. It should be appreciated that in many, if not most, versions two pantographs configured to establish or interrupt an electrical circuit with a first and a second overhead energized trolley line may be used. Descriptions herein of a control command sent to pantograph 40 should thus be understood to refer to control commands sent to two pantographs, such that the two pantographs are simultaneously adjusted. Trolley lines 100 may be either direct current or alternating current, and generator 24 may be configured as either a direct or alternating current generator. Electronics 28 may be configured appropriately for any of these combinations of alternating current and direct current via known techniques.

Also shown in FIG. 2 is a hydraulic pump 52 configured to transition hydraulic fluid from a tank 54 to actuating mechanism 42 of pantograph 40. To this end, actuating mechanism may include a hydraulic actuator, and an electrically actuated control valve 51 may be positioned fluidly between pump 52 and actuating mechanism 42. Hydraulic fluid may be supplied to actuating mechanism 42 from pump 52 and returned from actuating mechanism 42 to tank 54 by way of valve 51. Valve 51 might include a multi-position valve having a first position at which fluid is supplied to a head side chamber of actuating mechanism 42, and received from a rod side chamber and returned to tank 54. In a second position of valve 51, the fluid connections may be reversed, and in a third position the fluid connections may be blocked. Electronic control unit 62 may be in control communication with pump 52, and also in control communication with electrically actuated control valve 51. Transitioning power system 20 as noted above may include outputting a control command to electrically actuated control valve 51, in particular to electrical actuator 53. In alternative embodiments, pantograph 40 might be actuated via some other strategy, and actuating mechanism 42 might include a pneumatic actuator, an electrical actuator, or a ball and screw drive, for instance.

Also shown in FIG. 2 are a set of steering actuators 56 configured to steer front ground engaging elements 14. A steering sensor 70 is shown coupled with one of steering actuators 56, and is in communication with electronic control unit 62 such that electronic control unit 62 is configured to monitor a steering parameter of truck 10, such as a wheel steering angle. Steering sensor 70 might thus include a linear position sensor configured to monitor a position of the one of actuators 56, but in other embodiments might include a rotary position sensor coupled with one of the front ground engaging elements 14, or some other steering sensing mechanism. A front axle 58, which might include a one-piece or split front axle is shown extending between front ground engaging elements 14. A speed sensor 72 is shown coupled with axle 58, and in communication with electronic control unit 62 to enable electronic control unit 62 to monitor a speed parameter of mining truck 10. Those skilled in the art will appreciate that rather than monitoring axle speed, some other sensing strategy might be used such as monitoring wheel speed via a wheel speed sensor, or monitoring ground speed via signals from a local or global positioning system.

Each of the steering parameter and speed parameter are examples of dynamics parameters of mining truck 10. In connection with determining and acting upon an expected change in suitability of the mining truck for on-trolley operation, electronic control unit 62 may receive data indicative of at least one dynamic parameter, such as the steering parameter and speed parameter, and output the control command to actuating mechanism 42 responsively thereto. Sensors 70 and 72 may be part of a sensing system 69 configured to monitor the at least one dynamic parameter. Also shown in FIG. 2 is receiver or antenna 68, switch 34, and throttle control lever 32, each coupled with electronic control unit 62. Antenna 68 may be configured to receive data indicative of a real-time position of mining truck 10, as well as data indicative of the positions of other machines and various features at a mine site, such as trolley line 100 itself. Status information as to availability of different segments of trolley line 100, and potentially commands from a mine operation center, may also be received via antenna 18. Antenna 68 may also be configured to transmit signals from mining truck 10 for various purposes further described herein. Switch 34 may include a push button or the like which sends signals to, or is interrogated by, electronic control unit 62 for determining whether or not automated pantograph control is desired, as also further described herein. Throttle control lever 32 may in turn send signals to electronic control unit 62 indicative of an operator commanded throttle position. Electronic control unit 62 may output commands to electrically actuated throttle 74 in response to the commands from control lever 32 in a conventional manner. A control command outputted to transition between the on-trolley mode and the off-trolley mode may also include a command sent from electronic control unit 62 to rev up or rev down engine 22, as appropriate.

Electronic control unit 62 may be configured via appropriate software for executing various of the functions contemplated herein. To this end, electronic control unit 62 may include a data processor 64 coupled with a computer readable memory 66 storing computer executable code. Memory 66 may also store position data of an on-trolley suitability boundary, such that electronic control unit 62 can output control commands to actuating mechanism 42 responsive to a difference between real-time truck position data received via antenna 68 and the stored position data. In view of the foregoing, it may be appreciated that control system 60 may obtain a picture of where mining truck 10 is located relative to certain features of a mine such as trolley line 100, and also of what mining truck 10 is doing at a particular time, such as its ground speed, steering angle, and possibly other factors. Factors such as truck position, speed, and steering may be understood as internal parameters which electronic control unit 62 evaluates to detect expected changes in suitability of mining truck 10 for on-trolley operation, such that pantograph 40 may be adjusted, for example raised or lowered as appropriate, and such that power system 20 may transition between the on-trolley mode and the off-trolley mode. In the on-trolley mode, electrical power is provided to motors 26 from trolley line 100, whereas in the off-trolley mode electrical power may be provided to electric motors 26 from generator 24, or from an on-board energy storage device or the like (not shown). In still other embodiments, in the off-trolley mode wheels 14 of mining truck 10 might be powered via a mechanical coupling with engine 22 and not electrically powered at all.

One combination of the internal factors noted above which indicates suitability for on-trolley operation might include truck position within the on-trolley suitability boundary, a wheel steering angle of less than some predetermined angle, and a ground speed of greater than some predetermined minimum. Based upon these factors, it might be concluded that mining truck 10 is located such that pantograph 40 can electrically contact trolley line 100, mining truck 10 is not stopped, and not steering so sharply that truck 10 will imminently pass outside of the on-trolley suitability boundary. Conditions indicating that mining truck 10 is not suitable presently for on-trolley operation might include a truck position outside of the on-trolley suitability boundary, a wheel steering angle greater than some predefined angle, and a truck speed lower than some predefined speed, or zero. Under such conditions it might be concluded that mining truck 10 is not positioned such that pantograph 40 can electrically connect with trolley line 100, that truck 10 is stopped, or appears to be steering out of the on-trolley suitability boundary.

It will be appreciated that various different combinations of these and other factors may be used to conclude that mining truck 10 is presently suitable or unsuitable for on-trolley operation. It may further be appreciated that by monitoring the above factors, and possibly others, it is possible for control system 60 to recognize an expected change in suitability of mining truck 10 for on-trolley operation prior to the change actually occurring. For instance, if mining truck 10 rapidly decelerates, it may be concluded that mining truck 10 appears likely to stop, at which point it will be desirable to electrically disconnect from trolley line 100 for various reasons. Analogously, if mining truck 10 is presently steered relatively sharply, or a change in wheel steering angle is occurring relatively rapidly, it may be concluded that mining truck 10 appears to be headed towards steering off the trolley line and outside the on-trolley suitability boundary. Monitoring any of these dynamic parameters may indicate a condition has occurred or is expected to occur, which justifies disengaging from trolley line 100. Accordingly, electronic control unit 62 may set a fault based on data indicative of at least one dynamic parameter, and responsively output the control command to lower or stop raising pantograph 40. These data indicative of the at least one dynamic parameter may be encoded in inputs from sensing system 39 to electronic control unit 62.

Proximity of mining truck 10 to the on-trolley suitability boundary, or an expected change in proximity may also be indicative of an expected change in suitability of mining truck 10 for on-trolley operation. Any of these internal parameters, and possibly others, alone or in combination, may be indicative of an expected change in suitability of mining truck 10 for on-trolley operation. In anticipation of the change, and prior to occurrence of the change, electronic control unit 62 may output the control command to actuating mechanism 42.

Where data indicative of the expected change in suitability is received while mining truck 10 is outside the on-trolley suitability boundary, but appears to be approaching the on-trolley suitability boundary, the control commands may be outputted such that pantograph commences raising to the on-trolley configuration while mining truck 10 is outside the on-trolley suitability boundary, and reaches its on-trolley configuration simultaneously, or just after, mining truck 10 passes into the on-trolley suitability boundary. This particular strategy accounts for a delay time in raising pantograph 40 such that pantograph 40 may be electrically connected with trolley line 100 at the earliest possible time. In other words, at essentially the exact moment at which mining truck 10 becomes suitable for on-trolley operation, pantograph 40 may contact trolley line 100. A confirmatory signal may be outputted, via electronics 28 for instance, responsive to electrically connecting pantograph 40 with trolley line 100. Responsive to the confirmatory signal, electronic control unit 62 may command switching power sourcing in electronics 28 from generator 24 to pantograph 40, and command engine 22 to rev down.

Where the data indicative of an expected change is received while mining truck 10 is inside the on-trolley suitability boundary, the control command to actuating mechanism 42 may be outputted prior to mining truck 10 passing outside of the on-trolley suitability boundary, such that pantograph 40 commences lowering at or prior to the point at which electric power from trolley line 100 becomes no longer available. In parallel with adjusting pantograph 40, and still prior to occurrence of the expected suitability change, electronic control unit 62 may output a control command to electronics 28 such that power system 20 commences switching between the on-trolley mode receiving electric power from trolley line 100 to the off-trolley mode, receiving electric power from generator 24. A control command to electrically actuated throttle 74 may be outputted to begin revving up engine 22 in anticipation of a load demand from generator 24, where the expected change is from suitable for on-trolley operation to unsuitable.

As noted above, factors such as truck position, ground speed, and steering, may be understood as internal parameters. At a working mine site, various external factors may exist which can effect suitability of mining truck 10 for on-trolley operation. One of these external factors is the availability of different segments of trolley line 100. While various factors may bear upon whether a given trolley line segment is available or unavailable, in many instances availability will be determined by whether the subject trolley line segment is energized or de-energized. Individual segments of a trolley line may be de-energized for service, or because of problems such as a mining truck being stalled or getting a flat tire while operating under a particular segment. In any of these cases, it may be desirable for following trucks to operate in off-trolley mode until they can get past the problematic segment. To this end, electronic control unit 62 may receive data indicative of expected procession of mining truck 10 from a first part of a travel path coinciding with an available segment of trolley line 100, to a succeeding part of the travel path coinciding with an unavailable segment. It has been observed that in many instances where a segment of a trolley line is unavailable, mining truck operators will unwittingly drive the mining truck onto the unavailable segment expecting that operation in the on-trolley mode will continue to be available. As a result, a fault occurs and power to propulsion motors of the mining truck must stop at least briefly while the engine is revved up and the operator prepares to operate the mining truck in the off-trolley mode. In other instances, where trolley line availability is communicated to the operator, lights placed upon support poles of the trolley line are typically used. Such lights may be difficult to see under certain conditions or overlooked by the operator. By receiving data indicative of expected procession to the part of the travel path coinciding with the unavailable segment transitioning power system 20 from the on-trolley mode to the off-trolley mode may be seamless. A control command to transition power system 20 thusly may be outputted while mining truck 10 is receiving electrical power from an available segment, such that power system 20 commences transitioning to the off-trolley mode prior to the procession of mining truck 10 to the succeeding part of the travel path coinciding with the unavailable segment. In parallel with or as a part of thusly transitioning power system 20, pantograph 40 may be lowered, power sourcing in electronics 28 appropriately switched, and engine 22 revved up. Data may subsequently be received which is indicative of expected procession of the mining truck to a second succeeding part of the travel path coinciding with another available segment of trolley line 100, such that electronic control unit 62 can command transitioning power system 20 back to the on-trolley mode, responsive to the subsequent data.

INDUSTRIAL APPLICABILITY

Figure 3:
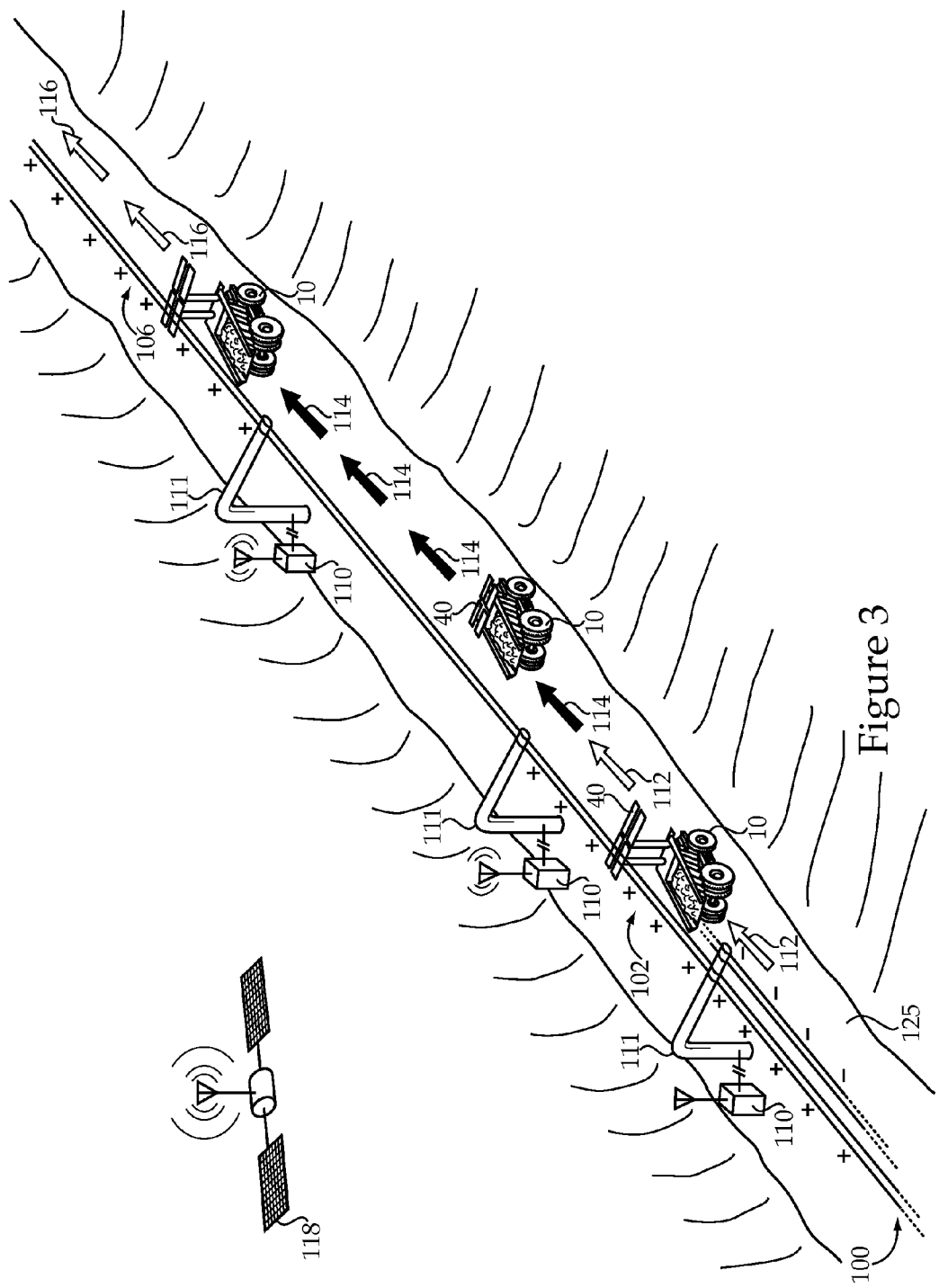
FIG. 3 is a diagrammatic view of a mining truck at multiple locations in a trolley-assisted mine environment.

Referring now to FIG. 3, there is shown mining truck 10 at three different locations upon a haul road 125. Trolley line 100 extends generally in parallel with haul road 125, and includes electrical wires and support cables if needed extending along and above haul road 125, supported via support poles 111 in a conventional manner. A plurality of local transmitter-receivers are positioned along trolley line 100, and each configured to receive and transmit data in a manner and for purposes further described herein. A satellite 118, representative of a plurality of global positioning satellites, is also shown in FIG. 3. Trolley line 100 includes a plurality of different segments, each of the segments being defined as the sections of the trolley line extending between adjacent support poles 111. A first set of arrows 112 denotes a part of a travel path of mining truck 10 coinciding with an available segment 102 of trolley line 100. Another set of arrows 114 denotes a second or succeeding part of the travel path coinciding with a succeeding segment 104 of trolley line 100 which is unavailable. Segment 104 may be de-energized. A next succeeding segment 106, which is available, coincides with a third part of the travel path of mining truck 10, denoted via arrows 116. Along the first part of the travel path, pantograph 40, and more particularly two pantographs, are in a raised position such that electrical power is supplied from available segment 102 to electric propulsion motor(s) of mining truck 10. Where mining truck 10 traverses the succeeding part of the travel path coinciding with unavailable segment 104, pantograph 40 is lowered, and truck 10 operates in the off-trolley mode, via electrical power from generator 24. Along the third part of the travel path, pantographs 40 are again raised and mining truck 10 operates in the on-trolley mode.

It will be recalled that power system 20 may be commanded to transition from the on-trolley mode to the off-trolley mode responsive to data indicative of expected procession of mining truck 10 from the first part of the travel path, arrows 112, coinciding with available segment 102, to the succeeding part of the travel path, arrows 114, coinciding with unavailable segment 104. During proceeding along haul road 125, receiver 68 may receive data indicative of a position of mining truck 10. These data may include remotely transmitted data, such as data transmitted from satellite 118, and conventionally additional global positioning satellites. Mining truck 10 may also receive data indicative of the unavailable or available status of each of trolley line segments 102, 104, 106. In a practical implementation strategy, memory 66 may store map data of trolley line 100 as noted above, such that electronic control unit 62 can determine responsive to the stored map data and the remotely transmitted position data what part of the travel path mining truck 10 is currently operating on, and which segment of trolley line 100 that part of the travel path coincides with. As mining truck 10 nears one of transmitter-receivers 110, electronic control unit 62 may, via signals transmitted via antenna 68, interrogate the appropriate local transmitter-receiver 110. Each of transmitter-receivers 110 may be coupled with trolley line 100, and may monitor the status of one or more of segments 102, 104, 106, such that the subject transmitter-receiver 110 can transmit data to mining truck 10 responsive to the interrogation. In this general manner, electronic control unit 62 will know the status of an upcoming segment of trolley line 100, and can take action prior to reaching the part of the travel path coinciding with a segment having availability different from the preceding segment.

In the FIG. 3 illustration, at the leftmost position of mining truck 10, electronic control unit 62 may be receiving data indicating that segment 104 is de-energized, for instance. Responsive to the data, electronic control unit 62 may command transitioning power system 20 to the off-trolley mode, command lowering pantograph 40 at an appropriate timing and rev up engine 22. In an analogous manner, when mining truck 10 approaches the transmitter-receiver located between segments 104 and 106, electronic control unit 62 may again perform an interrogation, and take appropriate actions depending upon the availability of segment 106. It has been observed that relatively limited wireless bandwidth at a mine site can be consumed by constant or frequent transmitting and receiving of data. Accordingly, the presently disclosed strategy, whereby mining truck 10 interrogates a local transmitter-receiver provides advantages. In alternative embodiments, a transmitter at the mine might continuously or intermittently transmit data indicative of the status of one or more trolley line segments. In addition, rather than receiving data remotely transmitted from a satellite or the like which is indicative of real-time mining truck position, a local transmitter can be used in a local positioning system for analogous purposes.

Figure 5:
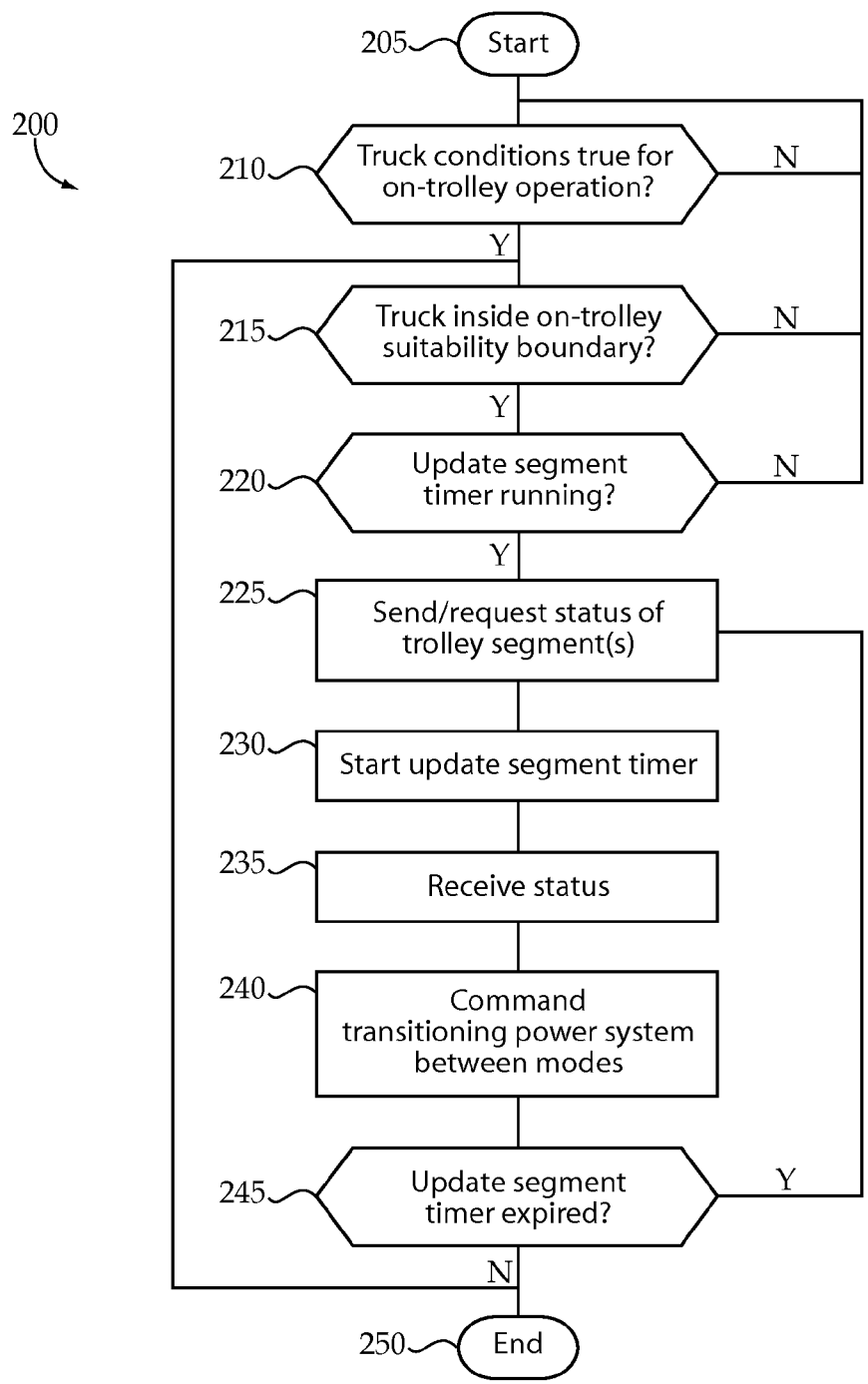
FIG. 5 is a flowchart of a control process according to one embodiment.

Turning now to FIG. 5, there is shown a flowchart 100 illustrating an example control process which may be used in applications similar to that illustrated in FIG. 3. The process of flowchart 100 may start at step 205, and proceed to step 210 to query whether truck conditions are true for on-trolley operation. The truck conditions of interest at step 210 might include dynamic parameters such as speed, steering, position, and possibly others. The conditions of interest at step 210 might also include whether or not mining truck 10 has been assigned to operate on-trolley or instead only off-trolley. It has been observed that certain trucks, or certain operators, may utilize trolley assist more efficiently than others despite best efforts in operator training and mining truck maintenance and equipment. For this reason, certain trucks may never operate on-trolley, or may not do so in the course of a given work shift, despite having such capability. From step 210, the process may proceed to step 215 to query whether mining truck 10 is inside an on-trolley suitability boundary. The procedure at step 215 may be understood as determining whether mining truck 10 is positioned appropriately for on-trolley operation at all. If yes, the process may proceed to step 220 to query whether an update segment timer is running. If yes, the process may proceed ahead to step 225 to send or request status of one or more trolley line segments. If any of steps 210-220 is false, the process may loop back to execute step 210 again, or might simply exit. As noted above, requesting the status may include interrogating a local transmitter-receiver, which may send the status via a signal to mining truck 10 in response to the interrogation. From step 225, the process may proceed ahead to step 230 to start the update segment timer, and thenceforth to step 235 to receive status of the trolley line segments. From step 235 the process may proceed to step 240 to command transitioning power system 20 between on-trolley and off-trolley modes as described herein. From step 240, the process may proceed to step 245 to query whether the update segment timer is expired. If no, the process may return to execute steps 215-245 again, or might end at step 250. If yes, the process may look back to execute steps 225-245 again.

Figure 4:
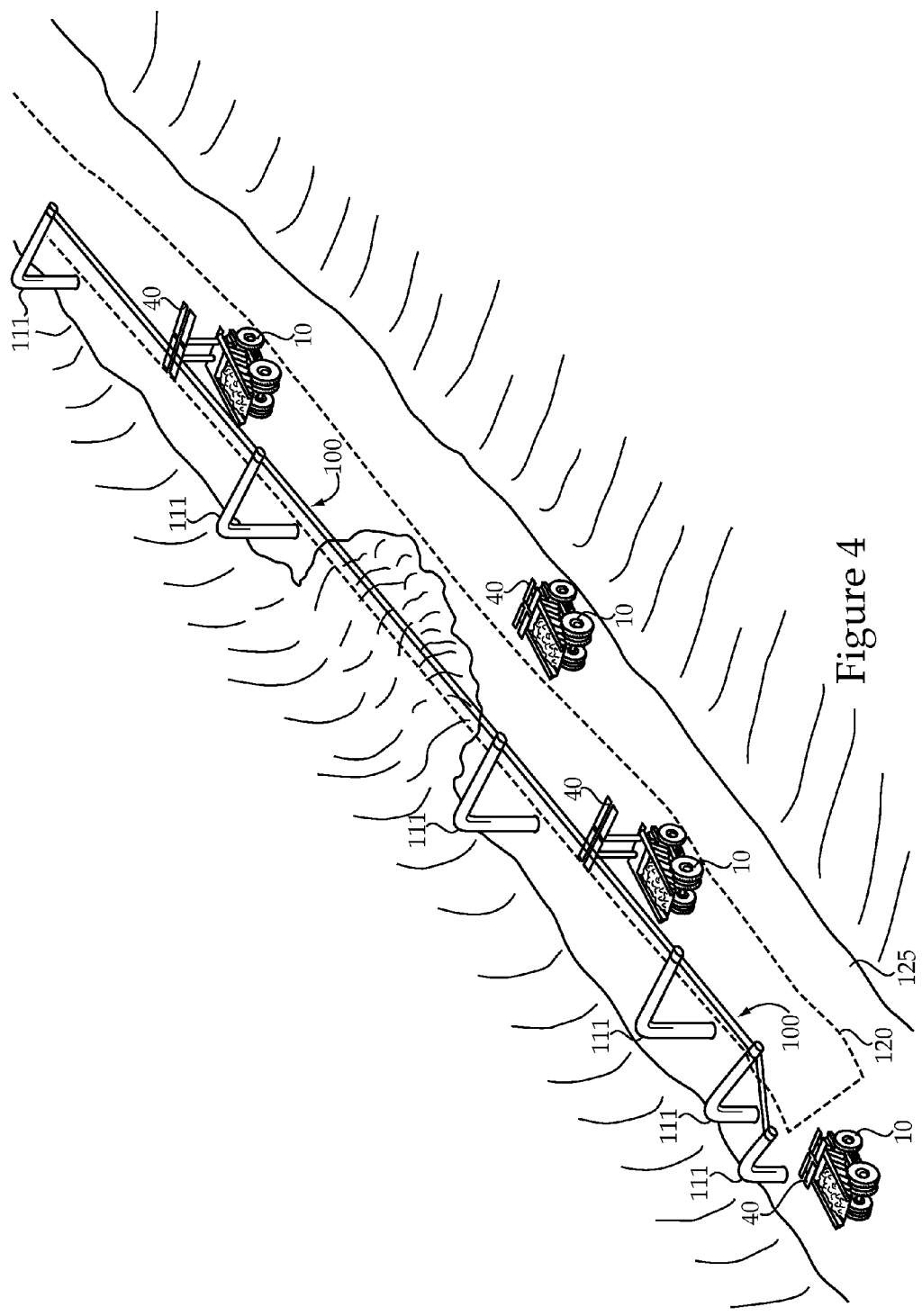
FIG. 4 is a diagrammatic view similar to FIG. 3.

Referring now to FIG. 4, there is shown mining truck 10 at four different positions along haul road 125, and illustrating raising and lowering pantograph 40 responsive to expected changes in suitability of mining truck 10 for on-trolley operation. In the leftmost illustration of mining truck 10, pantograph 40 is lowered, and mining truck 10 is approaching an on-trolley suitability boundary 120. Boundary 120 may be defined in part by a footprint of trolley line 100. Boundary 120 may also be defined in part by a tolerance for displacement from the footprint of trolley line 100 which is defined by a width of electrical contactor 48 of pantograph 40. In other words, given that electrical contactor 48 may include an elongate electrically conductive element extending width-wise across mining truck 10, mining truck 10 might be steered right or left within a tolerance without electrically disconnecting from trolley line 100. Although the footprint of trolley line 100 is not specifically illustrated in FIG. 4, the footprint may be understood as the shape of trolley line 100 which would be projected upon haul road 125 in a birds-eye view of trolley line 100. Boundary 120 may be closed, such that a fixed area is located upon haul road 125 within which pantographs 40 can contact and electrically connect with trolley line 100.

As noted above, electronic control unit 62 may output a control command to actuation mechanism 42 responsive to an expected change in proximity of mining truck 10 to the on-trolley suitability boundary. At the leftmost position of mining truck 10 shown in FIG. 4, electronic control unit 62 may be receiving data indicative of a position of mining truck 10, and comparing such data with stored map data for boundary 120. Based upon an expected change in proximity of mining truck 10 to the approaching edge of boundary 120, as indicated by such factors as a difference between real-time truck position data and the stored map data, speed, and travel direction of mining truck 10, electronic control unit 62 may output the control command to initiate raising pantograph 40 such that pantograph 40 contacts trolley line 100 at just the moment establishing an electrical connection with trolley line 100 becomes possible. This differs from prior strategies, in which operators were commanded or trained to initiate pantograph raising, and thus on-trolley operation, based upon a built-in tolerance, to prevent operators from raising the pantograph too early and snagging the trolley line. In the illustration of mining truck 10 second from the left in FIG. 4, pantograph 40 is raised to contact a trolley line 100. Proceeding to the right, at the next illustration of mining truck 10, mining truck 10 has been steered out of on-trolley suitability boundary 120 to avoid a material slide 130. Pantograph 40 has been lowered, and mining truck 10 operates in the off-trolley mode. As discussed above, electronic control unit 62 may be monitoring various internal parameters of mining truck 10 which can indicate that an expected change in suitability for on-trolley operation is likely to occur. Accordingly, when mining truck 10 is steered autonomously or by the operator just prior to reaching material slide 130, electronic control unit 62 may detect the steering angle or change in steering angle and/or position or change in position of mining truck 10, and responsively adjust pantograph 40 to the lowered position and commence transitioning power system 20 to the off-trolley mode. As mining truck 10 is steered back across and inside boundary 120 after passing slide 130, generally reverse procedures may transition mining truck 10 back to the on-trolley mode.

Figure 6:
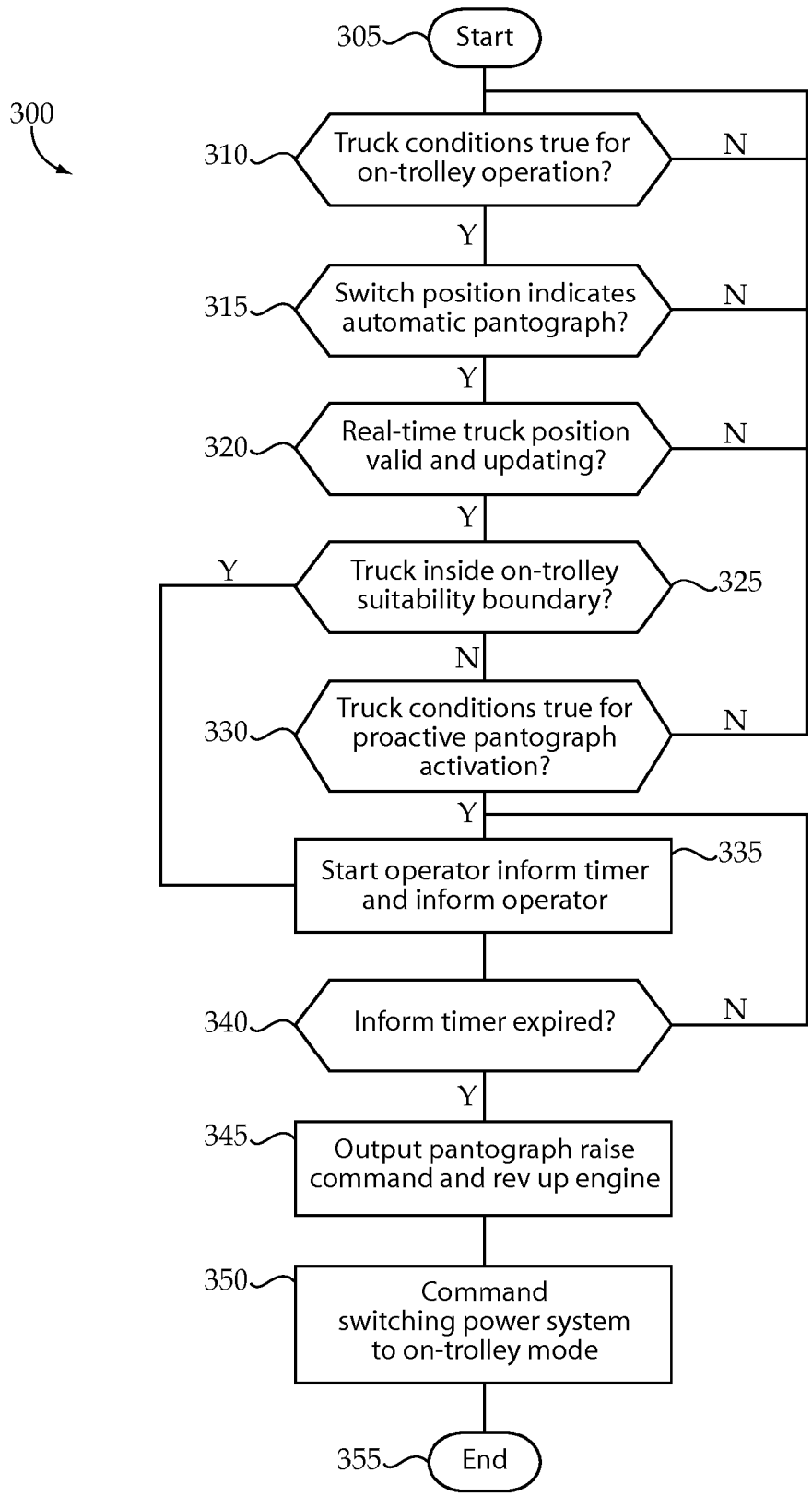
FIG. 6 is a flowchart of another control process, according to one embodiment.

Turning now to FIG. 6, there is shown a flowchart 300 illustrating an example control process analogous to operations illustrated in FIG. 4. The process of flowchart 300 may start at step 305, and thenceforth proceed to step 310 to query whether truck conditions are true for on-trolley operations. At step 310, electronic control unit 62 may be executing functions analogous to step 210 of FIG. 5. From step 310, the process may proceed to step 315 to query whether switch position indicates automatic pantograph. As discussed above, a position of switch 34 can indicate whether pantograph 40 is to be autonomously actuated, or whether instead an operator wishes to maintain manual control. If yes, the process may proceed to step 320 to query whether real-time truck position is valid and updating. At step 320, electronic control unit 62 may be understood as determining whether truck position tracking is operating as intended. From step 320, the process may proceed to step 325 to query whether the truck is inside the on-trolley suitability boundary. If yes, the process may proceed ahead to step 335. If no, the process may proceed to step 330 to query whether truck conditions are true for proactive pantograph actuation. At step 330, electronic control unit 62 may be understood to be determining whether factors such as steering angle, position, speed, and travel direction indicate that pantograph 40 may begin to be raised in advance of reaching a point at which electrical connection with trolley line 100 can be achieved. If yes, the process may proceed ahead to step 335. If the answer is no at any of steps 310, 315, 320 or 330, the process may loop back to begin executing the control routine again.

At step 335, the operator inform timer may be started and the operator informed of the intention to autonomously raise the pantograph. At step 340, it may be queried whether the inform timer has expired. If no, the process may loop back to execute step 335 again. If yes, the process may proceed to step 345 to output a pantograph raise command, for instance a control signal to electrically actuated valve 51, and simultaneously output a command to electrically actuated throttle 74 to rev up engine 42. From step 345, the process may proceed to step 350 to command switching power system 20 to the on-trolley mode as described herein. While the process of flowchart 300 emphasizes proactively raising pantograph 40, it should be appreciated that generally analogous steps might be executed to lower pantograph 40 under appropriate conditions. The procedures illustrated in FIG. 6 may also be understood as applicable to instances where truck 10 is approaching boundary 120 at the start of trolley line 100, as well as instances where mining truck 10 is steered off of trolley line 100, outside of boundary 120, and then steered back on, approximately as depicted in FIG. 4.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of controlling a power system in a trolley assist-capable mining truck comprising the steps of:
   receiving data on an electronic control unit indicative of an expected change in suitability of the mining truck for on-trolley operation;
   outputting a control command from the electronic control unit to an actuating mechanism for a pantograph of the power system having a linkage and an electrical contactor coupled with the linkage, responsive to the data and prior to occurrence of the expected suitability change; and adjusting the pantograph between an on-trolley configuration, for powering an electric propulsion motor of the mining truck via electric power supplied via contact between the electrical contactor and an overhead trolley line, and a rest configuration, responsive to the control command;

wherein the step of receiving further includes receiving data indicative of a speed of the mining truck, a travel direction of the mining truck, and a difference between real-time position data for the mining truck and stored map position data, such that the electrical contactor is electrically connected or disconnected from the overhead trolley line via the adjustment of the pantograph, substantially coincident with occurrence of the expected suitability change.

2. The method of claim 1 wherein the step of receiving further includes receiving data indicative of an expected change in proximity of the mining truck to an on-trolley suitability boundary defined at least in part by a footprint of the overhead trolley line.

3. The method of claim 2 wherein the step of receiving includes receiving the data while the mining truck is outside the on-trolley suitability boundary, and the step of adjusting includes commencing raising the pantograph to the on-trolley configuration while the mining truck is outside the on-trolley suitability boundary.

4. The method of claim 3 further comprising the steps of outputting a confirmatory signal responsive to electrically connecting the pantograph with the overhead trolley line, and switching power sourcing from a generator to the overhead trolley line responsive to the confirmatory signal.

5. The method of claim 2 wherein the step of adjusting further includes commencing adjusting the pantograph responsive to a delay time between initiating and completing raising or lowering the pantograph between the raised and lowered positions.

6. The method of claim 2 wherein the step of receiving further includes receiving data indicative of at least one dynamic parameter of the mining truck.

7. The method of claim 6 further comprising a step of setting a fault responsive to the at least one dynamic parameter, and wherein the step of outputting further includes outputting the control command responsive to the fault.

8. The method of claim 6 wherein the at least one dynamic parameter includes a speed parameter and a steering parameter, and the step of adjusting the pantograph further includes adjusting the pantograph responsive to the speed parameter and the steering parameter.

9. The method of claim 2 wherein the step of receiving includes receiving the data while the mining truck is inside the on-trolley suitability boundary, and wherein the step of adjusting includes lowering the pantograph to the rest configuration.

10. The method of claim 9 further comprising a step of switching the power system from an on-trolley mode to an off-trolley mode responsive to the data.

11. A power system for a trolley assist-capable mining truck comprising:
a pantograph for powering an electric propulsion motor of the mining truck via electric power from an overhead trolley line, the pantograph including a linkage configured to couple with a body of the mining truck;
the pantograph further including an electrical contactor coupled with the linkage, and an actuating mechanism configured to adjust the pantograph between an on-trolley configuration for contacting the electrical contactor with the overhead trolley line, and a rest configuration; and
an electronic control unit in control communication with the actuating mechanism, the electronic control unit being configured to receive data indicative of an expected change in suitability of the mining truck for on-trolley operation, and responsively output a control command to the actuating mechanism prior to occurrence of the expected suitability change;
wherein the data includes data indicative of a speed of the mining truck, a travel direction of the mining truck, and a difference between real-time position data for the mining truck and stored map position data, such that the electrical contactor is electrically connected or disconnected from the overhead trolley line via the adjustment of the pantograph in response to the control command, substantially coincident with occurrence of the expected suitability change.

12. The power system of claim 11 further comprising a sensing system configured to monitor at least one dynamic parameter of the mining truck, and wherein the electronic control unit is further configured to output the control command responsive to the at least one dynamic parameter.

13. The power system of claim 12 wherein the sensing system includes a steering sensor configured to monitor a steering parameter of the mining truck and a speed sensor configured to monitor a speed parameter of the mining truck.

14. The power system of claim 12 wherein the electronic control unit is further configured to set a fault responsive to inputs from the sensing system, and to responsively lower or stop the pantograph via the control command.

15. The power system of claim 11 wherein the expected change in suitability includes an expected change in proximity of the mining truck to an on-trolley suitability boundary.

16. The power system of claim 15 wherein:
the on-trolley suitability boundary includes a closed boundary defined in part by a footprint of the overhead trolley line and in part by a tolerance from the footprint defined by a width of the electrical contactor; and
the power system further includes a computer readable memory storing position data of the on-trolley suitability boundary.

17. A mining truck comprising:
a frame;
ground engaging propulsion elements coupled with the frame;
a power system including an electric propulsion motor, and a pantograph configured for powering the electric propulsion motor via electric power from an overhead trolley line;
the pantograph having a linkage, an electrical contactor coupled with the linkage and an actuating mechanism configured to adjust the pantograph between an on-trolley configuration for contacting the electrical contactor with the overhead trolley line, and a rest configuration; and
the power system further including an electronic control unit configured to receive data indicative of an expected change in suitability of the mining truck for on-trolley operation, and responsively output a control command to the actuating mechanism prior to occurrence of the expected suitability change;
wherein the data includes data indicative of a speed of the mining truck, a travel direction of the mining truck, and a difference between real-time position data for the mining truck and stored map position data, such that the electrical contactor is electrically connected or disconnected from the overhead trolley line via the adjustment of the pantograph in response to the control command, substantially coincident with occurrence of the expected suitability change.

18. The mining truck of claim 17 wherein the electronic control unit is further configured to output the control command to the actuating mechanism such that the pantograph commences adjusting between the rest configuration and the on-trolley configuration prior to occurrence of the expected suitability change.

19. The mining truck of claim 18 further comprising a receiver configured to receive the real-time truck position data, and wherein the electronic control unit is further configured to output the control command responsive to a difference between the real-time truck position data and the stored position data of an on-trolley suitability boundary.

20. The mining truck of claim 17 further comprising a second pantograph having a second actuating mechanism, and wherein the electronic control unit is further configured to output control commands to each of the first and second actuating mechanisms responsive to the data, such that the first and second pantographs are simultaneously adjusted to establish or interrupt an electrical circuit with a first and a second overhead trolley line.

* * * * *